Feb. 20, 1934.  K. D. FULLER  1,947,842
ELEVATOR
Filed Oct. 1, 1932  2 Sheets-Sheet 1

Inventor
Kenneth D. Fuller,
deceased
by Robert E. Hickerson,
Administrator.

Attorney.

Feb. 20, 1934.  K. D. FULLER  1,947,842
ELEVATOR
Filed Oct. 1, 1932  2 Sheets-Sheet 2
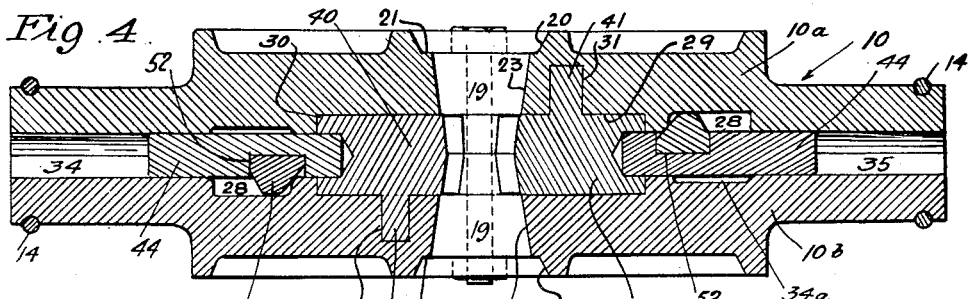
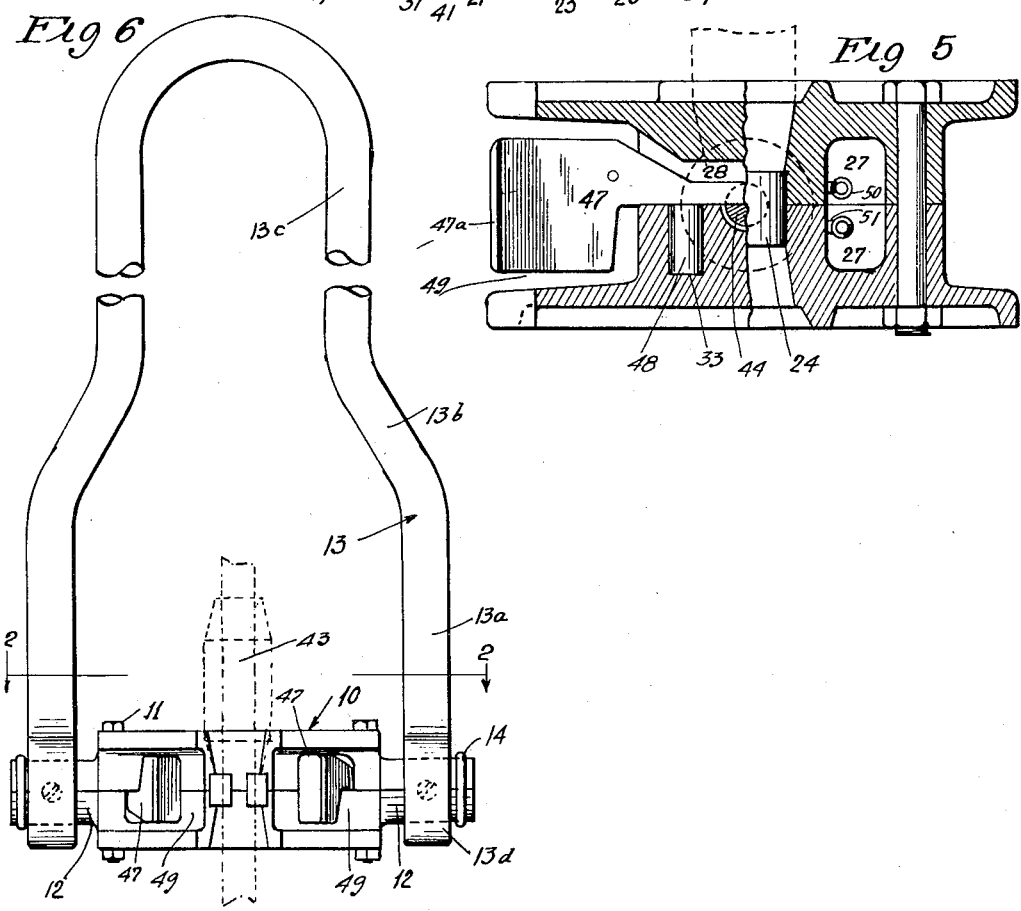
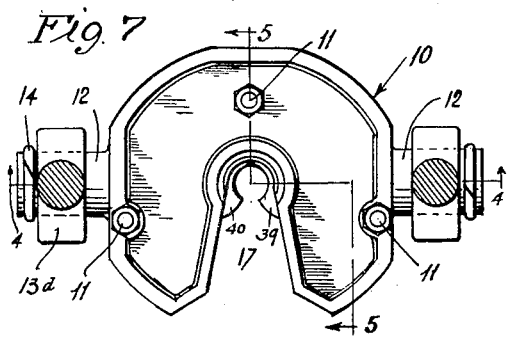
Inventor.
Kenneth D. Fuller.
deceased.
by Robert E. Hickerson
Administrator
Attorney.

Patented Feb. 20, 1934

1,947,842

UNITED STATES PATENT OFFICE 1,947,842

ELEVATOR

Kenneth D. Fuller, deceased, late of Huntington Beach, Calif., by Robert E. Hickerson, administrator, Huntington Beach, Calif., assignor to R. E. Hickerson Application October 1, 1932. Serial No. 635,752

20 Claims. (Cl. 294—91)

This invention has reference to elevators for use in the handling of pipe or pump rod strings in oil well operations, and while the invention in certain of its aspects is applicable to either drill pipe or pump rod elevators, the invention has been primarily developed for the latter type. It will be understood however that the term "rod", as hereinafter used, is to be regarded as capable of broad interpretation to mean pipe as well as solid rod.

The principal objects of the invention are directed to features whereby the efficiency and dependability of operation of elevators of the type named are substantially improved, as well as the facility and safety with which they may be used. Further objects deal with improvements in the pipe or rod locking parts of the elevator, and particularly in locking mechanisms of the spring or snap acting type. The invention also contemplates novel features in elevator body constuctions whereby the elevator is rendered capable of operation with the body in reversed position.

The above mentioned features and objects will be most readily explained and understood to best advantage from the following detailed description of a typical and preferred form of elevator embodying the invention.

Fig. 4 is a section on line 4—4 of Fig. 7;

Fig. 5 is an enlarged section on broken line 5—5 of Fig. 7;

Fig. 6 is a general front elevational view of the elevator; and

Fig. 7 is a plan view on line 2—2 of Fig. 6.

Figure 1:
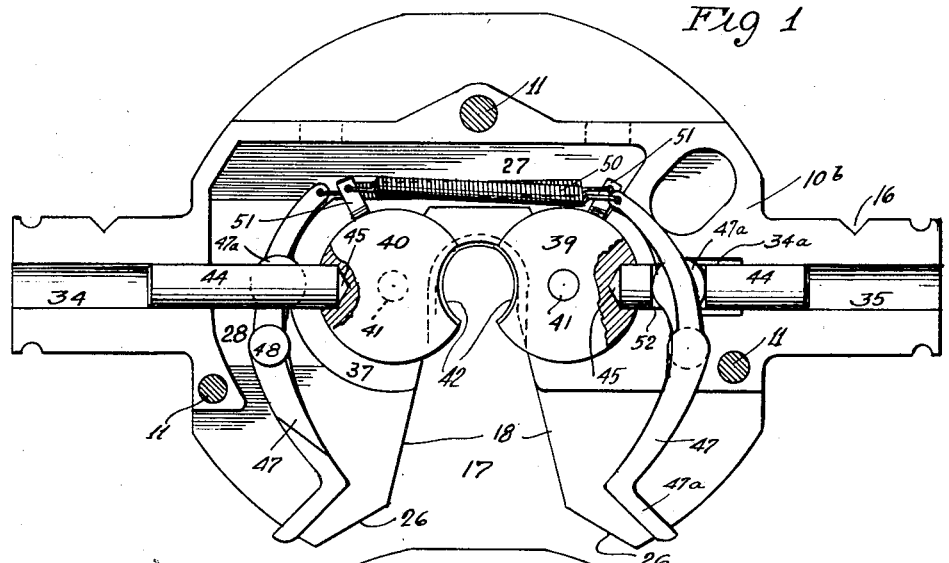
Figure 1 is a plan view, with one of the body sections and the bail removed, showing the parts in rod locking positions.

In the drawings, the elevator body, generally designated by the numeral 10, is shown to comprise a pair of sections 10a and 10b of identical construction, attached together by suitable means, as by bolts 11. The body has a pair of trunnions 12 to which a bail 13 is attached, the bail being prevented from lateral movement on the trunnions by locking rings 14. As shown in Fig. 6, portions 13a of the bail arms extend vertically upward from the trunnions, and thence inwardly at 13b, from which portions they continue vertically at 13c. Each of the eyes 13d of the bails fitted on the body trunnions, carries a spring pressed detent 15, see Fig. 2, which is adapted to project into a recess 16 in the trunnion to releasably hold the bail in its upright position of Fig. 6. By providing means for so holding the bail in its upright position, the bail is prevented from falling onto the derrick floor, and the operator is enabled to lift the elevator or apply the usual hoisting hook to the bail, without having to swing the latter up from the floor.

The body has a central pipe receiving way at 17, the sides 18 of which converge inwardly to terminate in an arcuate walled opening 19 within which the pump rod is adapted to be locked, as will hereinafter appear. As shown most clearly in Figs. 4 and 5, opening 19 is formed by an upper arcuate and downwardly sloping wall 20, at the lower end of which is formed a shoulder 21 upon which the rod joint is supported. A downwardly tapering wall 23 continues below shoulder 21, while below the tapering portion 23, the wall at 24, see Fig. 5, is substantially cylindric. It will be noted that the walls defining the opening 19 are shaped substantially in accordance with the parts of the rod and the rod joint or coupling member, shown at 43 in Fig. 6, which they receive. It will be further noted that the walls about the opening 19 in the lower body section are correspondingly shaped so that the position of the elevator may be reversed, and the elevator operated in either position.

As will be understood, the converging sides 18 of the rod receiving way in the body serve to guide or center the rod within opening 19 as the elevator is swung against the rod. The forward faces 26 of the body may also be converged inwardly for the purpose of guiding the rod within way 17.

Figure 2:
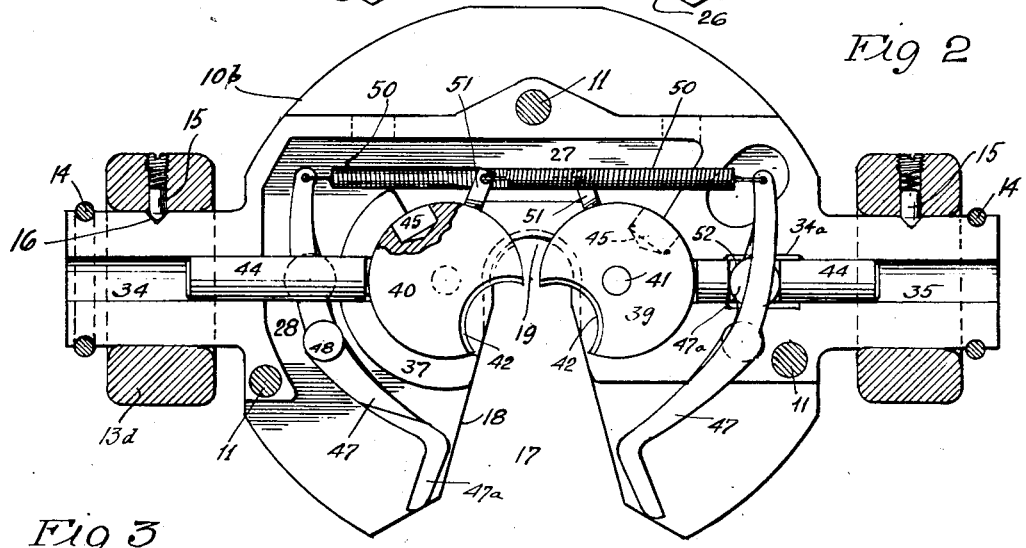
Fig. 2 is a view similar to Fig. 1, but showing the bail in section and the parts in rod releasing positions.
Figure 3:
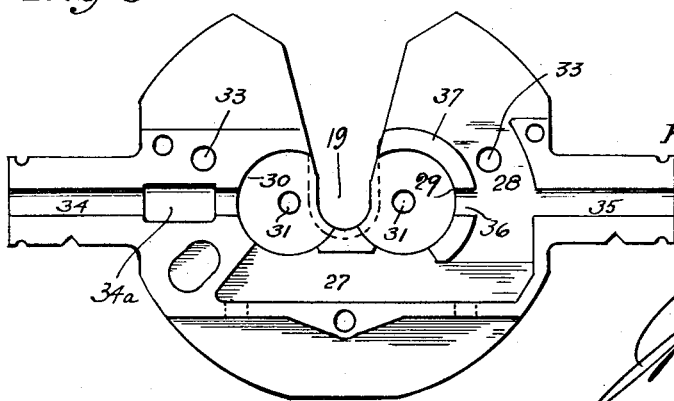
Fig. 3 is a plan view of the interior of one of the body sections, the locking elements, pins, levers, and springs being removed.

Referring now to Figs. 1 to 3, the interior of each body section is shown to be cast or otherwise formed with a spring receiving recess 27 extending longitudinally of the transverse axis of the body, and also a recess at 28 for receiving one of the lock operating levers hereinafter described. Circular recesses are formed at 29 and 30 to receive the rod locking elements, there being openings 31 in the bottoms of these circular recesses to receive the trunnions on which the locking elements rotate. Only one locking element trunnion will be inserted within one of the openings 31 in each of the body sections, but I preferably provide two such openings in order that the locking elements may be reversed in position, if desired, when the parts become worn, without the necessity for replacements. Recesses 33 are formed in each body section at opposite sides of the way 17 and recesses 29 and 30, for the purpose of receiving the trunnion portions of the operating levers.

Bores 34 and 35 extend longitudinally through the body trunnions 12, bore 35 continuing at 36 through rib 37 around recess 29. An enlarged diameter bore 34a is formed intermediate the ends of bore 34, for purposes that will presently appear, while only one of the lever trunnions will be fitted into one of the body recesses 33. The latter are provided in duplicate, as in the case of the locking element trunnion receiving openings 31, in order that the positions of the operating levers may be reversed, if desired, when the parts have become worn.

A pair of circular and rotatable rod locking elements 39 and 40 are contained within recesses 29 and 30, the locking elements having integral trunnions 41, inserted within openings 31. Each of the locking elements has an arcuate recess 42 which, with the parts in the position shown in Fig. 1, receive the rod. As will be noted, the rod is effectively locked against removal from the body, within the elements 39 and 40 in the positions of Fig. 1.

A pair of locking pins 44 are carried within bores 34 and 35, the inner ends of these pins being movable into recesses 45 in the rod locking elements, for the purpose of locking the latter in the positions of Fig. 1. Pins 44 are longitudinally movable out of recesses 45 to permit rotation of the locking elements, upon manual operation of the actuating levers, as will now be described.

A pair of levers 47 extend within recesses 28 in the body, these levers having integral trunnions 48, see Fig. 5, intermediate their ends, the trunnions being inserted within openings 33 in the body. The forward portions of levers 47 project within openings 49, see Fig. 6, in the front portion of the body, the ends 47a of the levers extending at an angle as indicated to permit their being readily grasped and operated by hand. Each of levers 47 is connected at its inner end to one of the rotatable rod locking elements by way of coil spring 50 attached to pin 51 projecting from the periphery of the locking element. Intermediate their trunnions 48 and inner end connections with springs 50, arms 47 have enlarged cam portions extending within transverse slots 52 in pins 44, the enlarged half-bores 34a in the body permitting transverse movement of the enlarged cam portions 47a of the arms in moving the pins 44.

In describing the operation of the elevator, it may first be assumed that it is desired to release the rod from being locked within the body by the parts in the positions shown in Fig. 1. By grasping the end portions 47a of the levers and drawing them together toward the positions of Fig. 2, springs 50 are put under tension tending to rotate locking elements 39 and 40 toward their rod releasing positions. Simultaneously, pins 44 are being retracted from openings 45 by the cam action of portions 47a of the levers, upon operation of the latter as described. Before the pins are fully retracted from openings 45, springs 50 have been put under tension, and when the pins move out of openings 45 to the point of releasing the locking elements, the latter snap around to their releasing positions of Fig. 2.

By virtue of the snap-action of the locking elements as they swing around to their rod releasing positions, a very practical advantage is gained as a result of the locking elements being thrust against the rod under the influence of the springs. A reaction results from the thrusting of the locking elements against the rod, tending to cause the body to swing away from the rod to such an extent that the rod may substantially clear the opening 17 without further effort on the part of the operator than is required to release the locking elements. The ability of the elevator to automatically swing in a rod clearing direction after release of the locking elements is believed to be a broadly novel feature inasmuch as it has heretofore always been necessary in elevators of this general character, to manually swing them clear of the pipe or rod after release of the rod holding or locking means.

It may be mentioned that no tension need be put upon the springs except during the interval of operation or movement of the locking elements. That is to say, with the parts in the positions of Fig. 1, the springs need not, and preferably will not be under tension, and it is only, in the rod releasing operation, upon movement of the forward ends of the levers together, that tension is imposed on the springs. When the locking elements snap to their rod releasing positions, the springs resume their normal contraction, with no substantial tension, inasmuch as in both positions of Figs. 1 and 2, the distance between the inner ends of arms 47 and pins 51 remains the same. This feature will be recognized as being of particular advantage in that wear and frequent replacement of the springs is avoided by their being put under tension only during the short intervals of operation.

No manual operation of the parts is necessary in applying the elevator to the rod. By swinging the elevator against the rod so as to bring the latter into engagement with the inner adjacent portions of the locking elements 39 and 40 in their releasing positions, the impact against the rod is sufficient to rotate the locking elements in the directions of the arrows in Fig. 2, to the point at which pins 44 will snap into openings 45 to retain elements 39 and 40 in their locking positions. This action of the pins is instantaneous since rotation of the locking elements by impact against the rod places springs 50 under tension holding the locking pin against the cylindric peripheries of the locking elements.

By virtue of the positions of the lock actuating levers within the body, and the characteristics of operation of the locking mechanism, it will be seen that when the rod is locked within the elevator, accidental release is rendered extremely difficult. By reason of the outer portions of levers 47 being contained within body recess 49, the arms are effectively prevented from being accidentally struck in such manner as to release the locking parts. Furthermore, in order to release the lock to free the rod, it is necessary that both levers be simultaneously brought together, thus rendering remote the possibility of the arms being accidentally struck or otherwise accidentally operated to release the lock.

While for purposes of illustration and description the invention has been shown to be embodied in an elevator having certain particularities and details of construction, it is to be understood that the invention is not to be regarded as limited to the illustrated or any specific form, since various changes and modifications may be made without departure from its intended spirit and scope.

What is claimed is:

1. In a rod elevator, the combination comprising, a body, means for locking a rod within the body, said means being movable to rod locking position by engagement with a rod, means for releasing said rod locking means for movement to rod releasing position, and means for thrusting said rod locking means, when released, against the rod, the last mentioned means including a spring acting to thrust the locking means against the rod and maintained under predetermined tensional condition when the locking means is in rod releasing position and under substantially the same tensional condition when the locking means is in rod locking position.

2. In a rod elevator, the combination comprising, a body, means for locking a rod within the body, said means being movable to rod locking position by engaging with a rod, means for locking said rod locking means in the last mentioned position, and means for manually moving the last mentioned means to releasing position, the last mentioned means including a spring connected to the rod locking means and maintained under no substantial tension when the locking means is in either rod releasing or rod locking positions.

3. In a rod elevator, the combination comprising, a body, means for locking a rod within the body, said means being movable to rod locking position by engagement with a rod, means for locking said rod locking means in the last mentioned position, and means for manually moving both said means to rod releasing positions, the last means including a spring connection with the rod locking means.

4. In a rod elevator, the combination comprising, a body, means for locking a rod within the body, said means being movable to rod locking position by engagement with a rod, means for locking said rod locking means in the last mentioned position, and means for manually moving both said means to rod releasing positions, the last mentioned means including a member operatively connected to both said locking means.

5. In a rod elevator, the combination comprising, a body, means for locking a rod within the body, said means being movable to rod locking position by engagement with a rod, means for locking said rod locking means in the last mentioned position, and means for manually moving both said means to rod releasing positions, the last mentioned means including a lock actuating member operatively associated with the second mentioned locking means and a spring connecting said member with the first mentioned locking means.

6. In a rod elevator, the combination comprising, a body, a pair of locking elements for locking a rod within the body, said elements being movable to rod locking positions by engagement with a rod, and a pair of members connected to said locking elements and manually operable to move said elements to rod releasing positions.

7. In a rod elevator, the combination comprising, a body, a pair of locking elements for locking a rod within the body, said elements being movable to rod locking positions by engagement with a rod, means for locking said elements in the last mentioned positions, a pair of members yieldably connected to said locking elements and operatively associated with said means, said members being operable to release said locking means from locking association with said elements and to move said elements to rod releasing positions.

8. In a rod elevator, the combination comprising, a body, a pair of pivotally movable rod locking elements at opposite sides of a rod receiving way in said body, a pair of longitudinally movable pins engageable with said elements to lock them in rod locking positions, a pair of pivotally movable lock releasing members, yielding means connecting said member with said locking elements, and means for locking said elements in rod locking positions, the last mentioned means being operable by said members to release said elements for movement to rod releasing positions.

9. In a rod elevator, the combination comprising, a body, a pair of pivotally movable rod locking elements at opposite sides of a rod receiving way in said body, a pair of longitudinally movable pins engageable with said elements to lock them in rod locking positions, a pair of pivotally movable lock releasing members, yielding means connecting said member with said locking elements, and a pair of longitudinally movable pins engageable with said elements to lock them in rod locking positions, said pins being movable by said members to release said locking elements for movement to rod releasing positions.

10. In a rod elevator, the combination comprising, a body, a pair of movable rod locking elements at opposite sides of a rod receiving way in said body, a pair of levers extending at opposite sides of said locking elements, springs connecting said levers with the locking elements, and means for locking said elements in rod locking positions, the last mentioned means being releasable and said locking elements movable to rod releasing positions by manual operation of said levers.

11. In a rod elevator, the combination comprising, a body having a pair of trunnions, a pair of circular rod locking elements mounted for pivotal movement at opposite sides of a rod receiving way in said body, each of said elements having a rod receiving recess, a pair of levers extending at opposite sides of said locking elements, springs connecting said levers with the locking elements, a pair of pins engageable within openings in said elements to lock the latter in rod locking positions, said pins being retractable from said openings to release said locking elements for turning and said elements being movable to rod releasing positions by manual operation of said levers.

12. In a rod elevator, the combination comprising, a body having a pair of trunnions, a pair of circular rod locking elements mounted for pivotal movement at opposite sides of a rod receiving way in said body, each of said elements having a rod receiving recess, a pair of levers extending at opposite sides of said locking elements mounted for pivotal movement intermediate their ends, springs connecting said levers with the locking elements, said springs being contained in a body recess extending parallel with said trunnions at the sides of said elements furthest from said pipe receiving way, a pair of pins engageable within openings in said elements to lock the latter in rod locking positions, said pins being retractable from said openings to release said locking elements for turning and said elements being movable to rod releasing positions by manual operation of said levers.

13. In a rod elevator, the combination comprising, a body having a rod receiving opening, said opening being formed by an upper arcuate wall having at its lower end an arcuate shoulder, and a downwardly tapered arcuate wall below said shoulder.

14. In a rod elevator, the combination comprising, a body having a rod receiving opening, said opening being formed by an upper downwardly tapered arcuate wall having at its lower end an arcuate shoulder, and a downwardly tapered arcuate wall below said shoulder.

15. In a rod elevator, the combination comprising, a body having a rod receiving opening, said opening being formed by an upper arcuate wall having at its lower end an arcuate shoulder, and a downwardly tapered arcuate wall below said shoulder; and a pair of locking elements in the body having arcuate recesses substantially registering with said opening.

16. In a rod elevator, a body having a rod receiving opening, said opening being formed by top and bottom arcuate walls, said top wall having at its lower end an upwardly facing shoulder and the bottom wall having at its upper end a downwardly facing shoulder, a downwardly tapering arcuate wall below said upwardly facing shoulder, and an upwardly tapering arcuate wall above said lower shoulder.

17. In a rod elevator, the combination comprising, a body having a rod receiving opening, a rod engaging element within said body and snap-acting means for thrusting said element against the rod to cause the body to move relatively away from the rod, the last mentioned means including a spring connected to said element and manually operable means for applying tension to the spring.

18. In a rod elevator, the combination comprising, a body having a rod receiving opening, a rod engaging element within said body, snap-acting means including a spring for thrusting said element against the rod to cause the body to move relatively away from the rod and a manually operable lever connected to one end of the spring.

19. In a rod elevator, the combination comprising, a locking element movable to rod locking and releasing positions, a manually movable member, and a spring connecting said member with the locking element, the points of connection between the spring and said locking element and member being substantially the same distance apart when the locking element is in rod releasing and locking positions so that the spring is maintained under substantially the same tensional conditions at said positions.

20. In a rod elevator, the combination comprising, a locking element movable to rod locking and releasing positions, means for releasably locking said element in its rod locking position, a manually movable member, and a spring connecting said member with the locking element, the points of connection between the spring and said locking element and member being substantially the same distance apart when the locking element is in rod releasing and locking positions so that the spring is maintained under substantially the same tensional conditions at said positions.

ROBERT E. HICKERSON,
*Administrator of the Estate of Kenneth D. Fuller, Deceased.*